(12) United States Patent
Tadakamalla et al.

(10) Patent No.: US 12,478,913 B1
(45) Date of Patent: Nov. 25, 2025

(54) SYSTEMS AND METHODS OF USING A COOLING SYSTEM IN A CARBON CAPTURE PROCESS

(71) Applicant: Schlumberger Technology Corporation, Sugar Land, TX (US)

(72) Inventors: Sruthi Tadakamalla, Sugar Land, TX (US); Mohamed Elbaccouch, Sugar Land, TX (US); Abigail Mshelbwala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/901,111

(22) Filed: Sep. 30, 2024

(51) Int. Cl.
  *B01D 47/12* (2006.01)
  *B01D 53/14* (2006.01)

(52) U.S. Cl.
  CPC ......... *B01D 47/12* (2013.01); *B01D 53/1475* (2013.01); *B01D 2257/504* (2013.01)

(58) Field of Classification Search
  CPC ............... B01D 47/12; B01D 53/1475; B01D 2257/504; B01D 53/1406; B01D 53/1412
  See application file for complete search history.

(56) References Cited

U.S. PATENT DOCUMENTS

| | | | |
|---|---|---|---|
| 9,192,888 B2 * | 11/2015 | Pandya | B01D 53/1406 |
| 2011/0135550 A1 * | 6/2011 | Nagayasu | B01D 53/1406 422/178 |
| 2011/0168020 A1 * | 7/2011 | Baburao | B01D 53/18 96/242 |
| 2011/0308389 A1 * | 12/2011 | Graff | B01D 53/1475 95/186 |
| 2012/0304859 A1 * | 12/2012 | Mihailowitsch | B01D 53/18 261/152 |
| 2013/0078171 A1 * | 3/2013 | Lemarie | B01D 53/346 423/223 |
| 2013/0186272 A1 * | 7/2013 | Balfe | B01D 53/58 95/228 |
| 2014/0086811 A1 * | 3/2014 | Saito | B01D 53/1412 422/111 |
| 2014/0127102 A1 * | 5/2014 | Okuno | B01D 53/62 422/106 |
| 2014/0178276 A1 * | 6/2014 | Guidolin | F23L 15/04 423/220 |
| 2016/0158688 A1 * | 6/2016 | Udatsu | B01D 53/18 96/242 |
| 2016/0361682 A1 * | 12/2016 | Yukumoto | B01D 53/1475 |
| 2017/0050141 A1 * | 2/2017 | Vitse | B01D 53/1412 |
| 2018/0200661 A1 * | 7/2018 | Pui | B01D 53/007 |
| 2018/0326347 A1 * | 11/2018 | Peters, Jr. | B01D 53/1475 |
| 2019/0001261 A1 * | 1/2019 | Tsujiuchi | B01D 53/1475 |
| 2022/0145201 A1 * | 5/2022 | Kakutani | C10L 3/104 |

* cited by examiner

*Primary Examiner* — Duane Smith
*Assistant Examiner* — Phillip Y Shao
(74) *Attorney, Agent, or Firm* — Jeffrey D. Frantz

(57) ABSTRACT

Provided herein a system including a solvent-based carbon capture system, wherein the solvent-based carbon capture system includes an absorber configured to capture carbon oxides from a gas flow via a solvent flow to produce a treated gas flow. The system also includes a water wash system configured to wash the treated gas flow using water. Further, the system includes a cooling system configured to cool the water of the water wash system, wherein the cooling system is configured to circulate a thermal fluid to reduce a temperature of the water in the water wash system.

14 Claims, 6 Drawing Sheets

SYSTEMS AND METHODS OF USING A COOLING SYSTEM IN A CARBON CAPTURE PROCESS

BACKGROUND

The present disclosure generally relates to systems and methods for capturing carbon oxides from post combustion systems using of an absorber in which the flue gas is absorbed by a liquid absorbent that interacts with the $CO_2$ in the flue gas to separate the $CO_2$ from the flue gas.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Industrial plants often combust hydrocarbon-containing materials, such as coal, oil, and natural gas, to generate heat and/or power for various equipment. However, due to growing environmental concerns, carbon capture processes (e.g., solvent-based) are implemented at industrial plants to reduce emissions (e.g., carbon dioxide ($CO_2$)) associated with the combustion process. Flue gas is generated as a byproduct of the combustion process and may be treated prior to being released into the atmosphere. For example, flue gas may be treated with amine solvents in an absorber for the removal of $CO_2$. The absorber may include packings to facilitate contact between the flue gas and the amine solvent, thereby absorbing the $CO_2$ into the solvent in an exothermic reaction. Unfortunately, a portion of the amine solvent may remain in the treated flue gas. Accordingly, a need exists for removing amine emissions in the treated flue gas.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, the present disclosure relates to a system including a solvent-based carbon capture system, wherein the solvent-based carbon capture system includes an absorber configured to capture carbon oxides from a gas flow via a solvent flow to produce a treated gas flow. The system also includes a water wash system configured to wash the treated gas flow using water. The system further includes a cooling system configured to cool the water of the water wash system, wherein the cooling system is configured to circulate a thermal fluid to reduce a temperature of the water in the water wash system.

In certain embodiments, a method includes capturing carbon oxides from a gas flow via a solvent flow in an absorber of a solvent-based carbon capture system to produce a treated gas flow. The method also includes washing the treated gas flow using water in a water wash system. The method further includes cooling the water of the water wash system via a cooling system, wherein cooling the water includes circulating a thermal fluid to reduce a temperature of the water in the water wash system.

In certain embodiments, a includes a controller having a processor, a memory, and instructions stored on the memory and executable by the processor to control a solvent-based carbon capture system to capture carbon oxides from a gas flow via a solvent flow in an absorber to produce a treated gas flow. The instructions include controlling a water wash system to wash the treated gas flow using water. The instructions also include controlling a cooling system to cool the water of the water wash system, wherein the cooling system is configured to circulate a thermal fluid to reduce a temperature of the water in the water wash system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
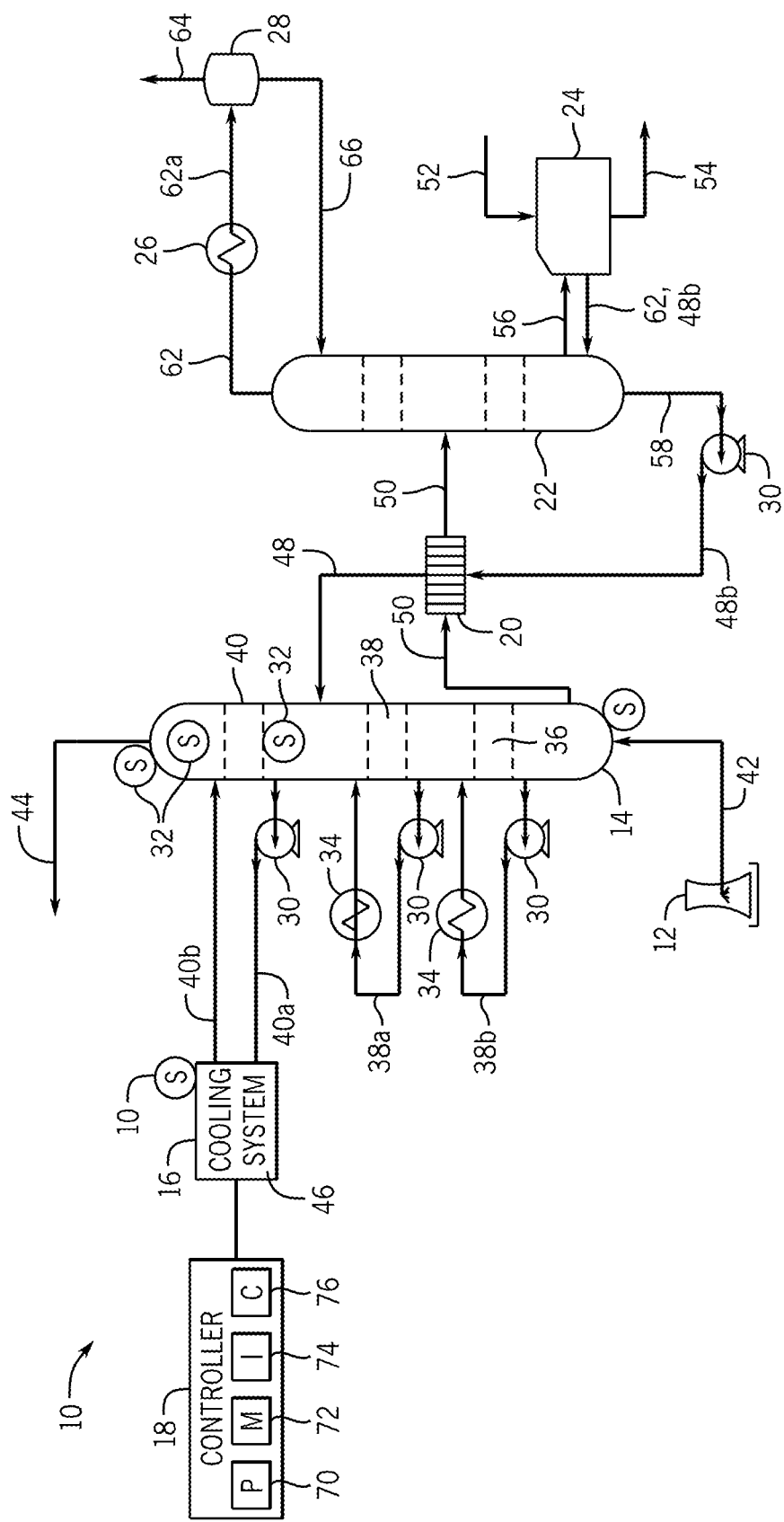
FIG. 1 is a schematic view of an embodiment of a carbon capture system with a cooling system coupled to a wash system, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B. elements. All numerical values within the detailed description herein are modified by "about" the indicated value, and take into account experimental error and variations that would be expected by a person having ordinary skill in the art. For example, "about" or "approximately" may refer to ±0.5%, ±1%, ±2, ±5%, ±10%, or ±15%.

In certain embodiments, a carbon capture system may be a solvent-based carbon capture system having an absorber, a stripper or regenerator, a solvent flow path through the absorber and the regenerator, one or more intercoolers coupled to the absorber, a wash system (e.g., wash columns, water wash system) coupled to the absorber, and a reboiler coupled to the regenerator. As discussed in detail below, the disclosed embodiments improve the wash system by incorporating a cooling system to reduce the temperature of the wash fluid, which is particularly beneficial in hot climates. In operation, an untreated flue gas may be sent to a direct contact cooler (DCC) to cool it before it is directed to the absorber. The absorber contains sections with packing materials (e.g., beads), thereby increasing contact and residence time between the untreated flue gas and an amine solvent, thereby facilitating absorption of undesirable gases (e.g., $CO_2$) from the untreated flue gas into the amine solvent. The absorption process is an exothermic process, and thus heat is added to the amine solvent in the absorber. Accordingly, intercoolers are employed to reduce the solvent temperature in the absorber, thereby helping to improve the efficiency of the absorption process. Subsequently, as the absorption process absorbs the undesirable gases from the untreated flue gas, the absorber may generate a treated flue gas that may include reduced emissions of the undesirable gases (e.g., $CO_2$) and solvent emissions at about 200-400 parts per million (ppm).

As such, the treated flue gas may be directed to the wash system, including a water wash columns (e.g., water wash, water wash column, first water wash column, second water wash column) and/or an acid wash column, where cooling water (e.g., cold water) is used to cool the flue gas and the solvent temperature to remove additional solvent. In certain embodiments, the source for the cold water is a cooling water chiller system, which is coupled to the one or more wash columns and generates cold water at a temperature of about greater than or equal to 15° C. After the first water wash, the estimated amount of amine solvent in the treated gas exiting the first water wash is about 80 to about 90% less than the amount of amine in the flue gas. The treated flue gas from the first water wash may be directed to a second water wash, followed by an optional acid wash to further lower the solvent emission. Accordingly, it may be desirable to develop a cooling system that can further reduce amine emissions in the treated flue gas by providing cold water at lower temperatures while decreasing energy consumption. However, efficient systems to reduce amine emissions in the treated flue gas and reduce energy consumptions have yet to be identified without the presently disclosed embodiments.

This disclosure relates to systems and methods for a cooling system to increase the chilling effect of cold water in the water wash columns (e.g., wash system) to lower amine emissions in the treated flue gas as part of the carbon capture system (e.g., solvent-based carbon capture system). In certain embodiments, the cooling system described herein may be a refrigerant system that employs a variety of thermal fluids (e.g., cooling fluids or coolants), such as a refrigerant fluid. In certain embodiments, the cooling system may use a thermal fluid other than water alone, such as a water-additive mixture (e.g., water-glycol mixture). The thermal fluid (e.g., water-glycol mixture) may include a combination of water and a glycol (e.g., ethylene glycol) mixture and the amount of water and glycol mixture may vary between 3:1, 2:1, 1:1, 1:2, or 1:3. In general, the presence of the glycol may allow water to be chilled to temperatures lower than water alone. For example, the cooling system with the thermal fluids disclosed herein (e.g., water-glycol mixture or refrigerant) may cool a water supply and generate cold water at temperatures ranging from about 5 to 10° C. or cooler, such as less than or equal to 0, 5, or 10° C. The cold water ranging from about 5 to 10° C. or cooler may be subsequently utilized by the water wash columns. In this way, the increased chilling efficiency of the cooling system may further reduce the amount of amine emission (e.g., amine slip) in the treated flue gas compared to cooling with water alone. For example, a partially treated flue gas may include 100 parts per million (ppm) of emissions. It is believed that the cooling system may reduce emissions by about 10 ppm, 9 ppm, 8 ppm, 7 ppm, 6 ppm, 5 ppm, 4 ppm, 3 ppm, 2 ppm, or 1 ppm for every 1° C. reduction in temperature. For example, it is believed that the emissions may continue to decrease and eventually reach a plateau. Accordingly, a few degrees reduction in temperature enhance the absorbent of amine in the wash system, thereby decreasing amine emissions from the water wash overhead and treated flue gas. Furthermore, the increasingly chilled water provided by the cooling system allows for the cooling system to be employed in parts of the world where temperatures are greater than or equal to 25° C., thereby increasing washing efficiency. The thermal fluid (e.g., water-glycol mixture) may also act as an antifreeze, thereby enabling operation at temperatures below the freezing temperature of water (e.g., below 0° C.). As such, the cooling system with the thermal fluid (e.g., water-glycol mixture) may be employed in parts of the world where temperatures may be less than or equal to 0° C. Accordingly, the cooling system and thermal fluid (e.g., water-glycol mixture) provide several advantages that allow reduce amine emission and enable cold fluids (e.g., temperatures ranging from about 0° C. to 20° C., such as about 4° C. to 20° C., about 4° C. to 16° C., about 8° C. to 12° C., or about 5° C. to 10° C.) for one or more columns in various parts of the world.

In one embodiment, the cooling system may be coupled to one or more water wash columns. For example, the washing process may include a first water wash, a second water wash, and an acid wash. The first water wash may be coupled to the cooling system, thereby allowing the first water wash to employ cold water (e.g., temperatures ranging from about 5 to 10° C. or cooler) to wash the treated gas exiting the absorber. In some embodiments, the cooling system may be coupled to the second water wash column. It should be noted that the cooling system may be coupled to one or more columns to provide a targeted low ppm amount of amine emission in the treated flue gas. For example, the implementation of the cooling system coupled to the one or more columns including the first water wash and/or the second water wash may achieve 1 ppm or less of amine emission in the treated flue gas exiting the acid wash. As such, the cooling system may reduce amine slip in the treated gas.

In one embodiment, the increased chilling efficiency of the cooling system described herein may improve the water wash process within the water wash columns as the cold water may reduce the amount of amine emission in the treated flue gas. Accordingly, the improved washing processes may allow for a modified configuration of the carbon capture system, such as a reduction in the number of water wash columns necessary to reduce amine emission, thereby increasing efficiency of the carbon capture system. Similarly, the increased chilling efficiency may provide additional downstream advantages such as a reduction in the size of the water wash columns.

In one embodiment, one or more columns may be omitted from the carbon capture configuration due to the increased chilling efficiency of the cooling system. For example, one water wash column may be omitted from the configuration, such that the wash system includes only one water wash column and one acid wash column for the washing process. In another example, one water wash column and one acid wash column may be omitted from the configuration, such that the wash system includes only one water wash column. Accordingly, the increased chilling efficiency provides numerous downstream advantages such as a reduction in the amount of amine emission, reduction in energy consumption by reducing and/or modifying the carbon capture configuration, reduction in the number of pumps employed by the carbon capture system, and reduction in amine degradation due to the absorber operating at a relatively lower temperature.

In some embodiments, the carbon capture system may be controlled by a controller (e.g., processor-based controller, control logic). Accordingly, the cooling system may be communicatively coupled to the controller or integrated into the controller to adjust operational parameters of the carbon capture system. The controller may facilitate in automatically adjusting the parameters of the cooling system columns based on a comparison of sensor feedback from various sensors and threshold data. For example, sensors may be disposed within the carbon capture system and provide feedback associated with the temperature, pressure, flow rate, composition, or any combination thereof, of the flue gas, the amine solvent, the wash fluid in the water wash, the thermal fluid (e.g., refrigerant fluid, water-glycol mixture, etc.) in the cooling system for the wash system, or any combination thereof. For example, the sensors may monitor the temperature and composition of flue gas (e.g., concentration of $CO_2$, amine, etc.), the flow rate, amount, and temperature of the thermal fluid (e.g., refrigerant fluid, water-glycol mixture, etc.) in the cooling system, the temperature and flow rate of the solvent in the absorber, and/or the temperature and flow rate of coolant in interstage coolers coupled to the absorber. In response to sensor feedback, the controller may modify one or more operational parameters of the gas capture system (e.g., temperature, amount, and flow rate of the thermal fluid in the cooling system, temperature and flow rate of wash fluids in the water wash, etc.) to optimize cycle time or reduce energy consumption. In one example, the controller may adjust parameters of one or more stages (e.g., absorption stage in the absorber, desorption stage in the regenerator, cooling stage using the cooling system/water wash). In another example, the controller may adjust the flow rate, amount, and/or temperature of the thermal fluid based on sensor feedback to remove a desired amount of amine from a partially treated flue gas in the water wash system to generate a treated flue gas that exhibits amine emissions substantially less than the partially treated flue gas. In certain embodiments, the controller may receive inputs from the user, thereby allowing the controller to adjust the operational and adjust cycle times/processes based on the selection provided by the user. As such, inefficient processes of the carbon capture system may be optimized to improve energetics of the carbon capture system.

As part of the control based on sensor feedback, the controller may compare the sensor feedback to threshold values, such as upper and lower thresholds for temperature, flow rate, amine concentration in the flue gas, undesirable gas ($CO_2$) concentration in the flue gas, analytical measurements (e.g., gas chromatograph, titrater, pH analyzer) for in-situ data analysis, or any combination thereof. For example, the controller may compare the sensor feedback of amine emission ppm of a treated flue gas exiting a first water wash column that may be coupled to the cooling system to a threshold value. Based on the comparison, if the amine emission ppm of in the treated flue gas is greater than the threshold value, the controller may increase the flow rate of the thermal fluid (e.g., refrigerant, water-glycol mixture, etc.) to further decrease the temperature of the cold water within the first water wash column. In this way, colder water may be supplied to the water wash column to further decrease amine emission ppm in the treated flue gas. As such, sensor feedback enables maximization and optimization of amine absorption in the wash system, thereby ensuring that water circulating in the wash system is saturated with amines and that one or more units (e.g., wash system, emissions control technology (ECT), cooling system) are operating at full capacity. In certain embodiments, the controller may receive inputs from the user, such as batch logged-in data or in-situ data, thereby allowing the controller to adjust the cooling system parameters based on the selection provided by the user. In this way, a reduction in amine slip and energy consumption may be optimized.

With the foregoing in mind, FIG. 1 is a schematic view of a carbon capture system 10 (e.g., solvent-based carbon capture system). In general, the carbon capture system 10 includes $CO_2$ plant 12, an absorber 14, a cooling system 16, a controller 18, a lean/rich absorbent heat exchanger (lean/rich HEX) 20, a stripper or regenerator 22, a reboiler 24, a reflux condenser 26, and a knock out drum (e.g., reflux drum) 28. The carbon capture system 10 may include pumps 30, sensors 32, and intercoolers 34 coupled to one or more components of the carbon capture system 10. The absorber 14 may include one or more interstage cooler systems 36, 38 and a wash system 40. As discussed in detail below, the cooling system 16 is configured to substantially cool the wash system 40 below the cooling capabilities of water cooling alone, thereby improving the efficiency of the wash system 40 for removing substances (e.g., amines) in the treated flue gas.

The $CO_2$ plant 12 (i.e., a $CO_2$ source, such as a power plant, refinery, steel) may include a variety of industrial plants that generate an untreated flue gas 42. For example, exhaust gas from the combustion of hydrocarbon materials may be discharged from the $CO_2$ plant 12 as the untreated flue gas 42 (e.g., $CO_2$ rich gas stream), which is in direct fluid communication with the absorber 14 via a conduit (e.g., pipe). The untreated flue gas 42 may include a variety of undesirable gases, such as carbon oxides ($CO_x$) (e.g., carbon dioxide ($CO_2$) and carbon monoxide (CO), sulfur oxides ($SO_x$), nitrogen oxides (NOx), and oxygen ($O_2$), which may be at least partially removed by the absorber 14. For example, the absorber 14 may be configured to at least partially or substantially remove the carbon oxides, such as $CO_2$, from the untreated flue gas 42. In some embodiments, a direct contact cooler (DCC) may directly contact the untreated gas 42 with a cooling fluid (e.g., water) to lower the temperature of the untreated flue gas 42 prior to entering the absorber 14 and may remove some of the undesirable contents (e.g., $SO_x$) in the untreated flue gas. For example, the temperature of the untreated flue gas 42 may range from about 25° C. to 40° C. The absorber 14 may be configured to receive the untreated flue gas 42 via an inlet port (e.g., as input). The untreated flow gas 42 may flow from a first end portion (e.g. bottom portion) to a second end portion (e.g., top portion) of the absorber 14, where it may contact with solvent 48 (e.g., amine solvent). The solvent stream 48 may be provided counter-current to the flow of the untreated flue gas 42. For example, the untreated flue gas 42 may flow generally upward through the absorber 14, whereas the solvent stream 48 may flow generally downward through the absorber 14. It should be noted that the solvent stream 48 is generally depleted or lean in $CO_2$ (e.g., $CO_2$-lean solvent stream) when entering the absorber 14, whereas the solvent stream 48 gradually increases in concentration of $CO_2$ and becomes $CO_2$-rich before exiting the absorber 14 as stream 50. As such, the solvent stream 48 may scrub (e.g., remove) $CO_2$ from the untreated flue gas 42 in the absorber 14. Although $CO_2$ is provided as an example of undesirable gas being scrubbed from the untreated flue gas 42, the absorber 14 may be configured to absorb one or more other undesirable gases, as noted above. The reaction between the solvent stream 48 and untreated flue gas 42 is an exothermic reaction. Accordingly, the absorber 14 may employ cooling methods (e.g., interstage cooler systems 36, 38 and a wash system 40) to cool the absorber 14 and generate a flue gas 44, wherein the flue gas 44 may include $CO_2$ amount substantially less than the untreated flue gas 42.

In general, the absorber 14 may include sections with packing or trays (e.g., beads held between upper and lower screens). It should be noted that the packing may be random or structured. Accordingly, the untreated flue gas 42 may first flow into the absorber 14 and come into contact with a first packing section (e.g., absorption stage), which resides at a lowest portion of the absorber 14. The interstage cooler system 36 may include a pump 30 and a heat exchanger 34 and may be coupled to the first packing section (e.g., absorption stage). Accordingly, the interstage cooler 36 may employ a cooling medium 38b such as water or air that may be pumped by pump 30 and cooled by the heat exchanger 34 to cool the absorber 14 as the reaction between the solvent stream 48 and untreated flue gas 42 occurs at the first packing section (e.g., absorption stage). As solvent stream 48 scrubs the untreated flue gas 42, a first partially treated flue gas (e.g., partially $CO_2$ depleted stream) may be generated, wherein the first partially treated flue gas exhibits $CO_2$ amounts less than the untreated flue gas 42. Furthermore, due to the exothermic reaction between the solvent stream 48 and untreated flue gas 42, the first partially treated flue gas may also include residual amine contaminants from the solvent stream 48. As such, the partially treated flue gas may be directed upwards into the absorber 14 and interact with a second packing section in order to increase $CO_2$ loading from the upward flue gas into the downward amine solvent. This leads to entrained amine in the treated flue gas as it travels upward in absorber 14 (e.g., absorption stage) coupled to the interstage cooler 38, which resides at a middle portion of the absorber 14.

The first partially treated flue gas may come into contact with the second packing section (e.g., second absorption stage) coupled to the interstage cooler 38, which may include a pump 30 and a heat exchanger 34. The interstage cooler 38 may employ a cooling medium 38a such as water or air that may be pumped by pump 30 and cooled by the heat exchanger 34 to cool the absorber 14 as the reaction between the solvent stream 48 and first partially treated flue gas occurs. As solvent stream 48 scrubs the first partially treated flue gas, a second partially treated flue gas (e.g., partially $CO_2$ depleted stream) may be generated, wherein the second partially treated flue gas exhibits $CO_2$ amounts less than the first partially treated flue gas. Furthermore, due to the exothermic reaction between the solvent stream 48 and untreated flue gas 42, the second partially treated flue gas may also contain residual amine contaminants from the solvent stream 48. In certain embodiments, the absorber 14 may include any number of packing sections (e.g., absorption stages), such as 1, 2, 3, 4, 5, or more packing sections (e.g., absorption stages) in series through the absorber 14. Accordingly, after the packing sections (e.g., absorption stages), the second partially treated flue gas may be directed upwards through the absorber 14 and enter the wash system 40, which resides at an upper portion of the absorber 14. In some embodiments, the wash system 40 may be separate from the absorber 14, such as outside of the absorber 14 along a flow path of the treated flue gas (e.g., second partially treated flue gas).

In general, the wash system 40 may be utilized to remove residual amine contaminants from the second partially treated flue gas. The wash system 40 may include a plurality of wash nozzles, a plurality of perforated tubes, a grid of wash jets, or a combination thereof, for each wash section or stage. Accordingly, the wash system 40 may be coupled to the cooling system 16. The cooling system 16 and the thermal fluid 46 (e.g., cooling fluid or coolant) may be utilized to cool water supply 40a. The thermal fluid 46 may include any thermal fluid (e.g., cooling fluid or refrigerant fluid) other than water alone, such as water with one or more additives (e.g., glycol), a refrigerant (e.g., working fluid in a refrigeration cycle), or any combination thereof. However, in some embodiments, the thermal fluid 46 may include water alone, while another cooling system is used to cool the water. In certain embodiments, the thermal fluid 46 may include a refrigerant or mixed refrigerant, such as difluoromethane (R-32, HFC-32), dichlorodifluoromethane (R-12, $CCl_2F_2$), trichlorofluoromethane (R-11), 1,2-dichlorotetralfluoroethane (R-114), trichlorotrifluoromethane (R-113), chlorodifluoromethane (R-22), mixture of difluoromethane (R032) and pentafluoroethane (R-125) (R-410a), mixture of difluoromethane (R-32), pentafluoroethane (R-125), and 1,1, 1,2-tetrafluoroethane (R-134a) (R-407c), carbon dioxide (R-744), propane (R-290), methane (R-50), butane (R-600), 1,1,1,2-tetrafluoroethane (R-134a, HFC-134a), pentafluoroethane (R-410a), isobutane (R-600a), ammonia (R-717), 2,3,3,3-tetrafluoropropene (R-1234yf, HFO-1234yf), or any combination thereof. The particular selection of the refrigerant or mixed refrigerant for the thermal fluid 46 may depend on refrigerant costs, performance, and environmental factors, including certain refrigerants being phased out and/or certain refrigerants being more environmentally friendly. However, the water-additive mixture (e.g., water-glycol mixture) may be particularly advantageous for the disclosed embodiments of the cooling system 16. It should be noted that the cooling system 16 may be directly coupled to the wash system 40 to provide direct cooling to the water supply. In some embodiments, the cooling system 16 may be indirectly coupled to the wash system 40. For example, the cooling system 16 may be configured to receive water supply 40a via an inlet port that may be provided by pump 30. The cooling system 16 may cool the water supply 40a, thereby generating cold water 40b via an outlet port. The cold water 40b may exhibit temperatures from about 5 to 10° C. or cooler. Accordingly, one or more water wash columns of the water system 40 may receive the second partially treated flue gas via an inlet port, wherein the cold water 40b may be circulated in the one or more water wash columns to remove residual amine contaminants associated with the solvent stream 48 and generate the flue gas 44. For example, the cold water 40b may be sprayed within the one or more water wash columns. As such, the flue gas 44 may include amine amounts substantially less (e.g., substantially amine-free) than the second partially treated flue gas.

As the untreated flue gas 42 reacts with solvent stream 48, the reaction may generate a $CO_2$-rich solvent stream 50. The solvent stream 48 absorbs $CO_2$ from the untreated flue gas 42, thereby reducing the $CO_2$ concentration in the flue gas and increasing the $CO_2$ concentration in the solvent stream. In some embodiments, the $CO_2$-rich solvent stream 50 absorbs a majority of the $CO_2$ from the untreated flue gas 42, such as greater than 60%, 70% 75%, 80%, 90%, 95% or more. Accordingly, the $CO_2$-rich solvent stream 50 is outputted via the absorber 14 via an outlet port. The $CO_2$-rich solvent stream 50 may be directed to lean/rich HEX 20, wherein the $CO_2$-rich solvent stream 50 is heated against solvent stream 48 (e.g., $CO_2$-lean solvent stream. Accordingly, the $CO_2$-lean solvent stream 48 may be directed to the absorber 14, while the $CO_2$-rich solvent stream 50 may be directed to regenerator 22.

The regenerator 22 may be positioned downstream from the lean/rich HEX 20, wherein the regenerator 22 may receive the $CO_2$-rich solvent stream 50 via an inlet port. The regenerator 22 may also be in direct communication with the reboiler 24, wherein the reboiler 24 is positioned downstream from the regenerator 22. Accordingly, the reboiler 24 may utilize steam 52 to generate heat needed for the regenerator 22, thereby producing condensate 54 as a byproduct in the process. In general, the $CO_2$-rich solvent stream 50 may be received by the regenerator 22, wherein the $CO_2$-rich solvent stream 50 may flow downwards into the regenerator 22, which is countercurrent with respect to a vapor that may be generated by the reboiler 24. In general, the vapor may be generated by heating a portion of the $CO_2$-rich solvent stream 50, thereby generating a $CO_2$/water vapor stream 62 and a $CO_2$depleted stream 56. Accordingly, the reboiler 24 may be positioned to receive the $CO_2$ depleted stream 56, wherein the $CO_2$ depleted stream 56 may be further heated by the reboiler 24 to remove additional $CO_2$ and further generate $CO_2$/water vapor stream 62. It should be noted that water (e.g., water vapor, vapor) may be entrained in the generated $CO_2$/water vapor stream 62 that exits regenerator 22. Accordingly, integration of lean/rich HEX 20, reboiler 24, and heat exchanger 26 minimizes water entrainment in stream 62 and enable desired $CO_2$ capture rate and purity in downstream products (e.g., $CO_2$ gas product 64). The reboiler 24 may output the $CO_2$ vapor stream 62 via a gas line back to the regenerator 22, such that it may exit the regenerator 22 accordingly. It should be noted that the $CO_2$/water vapor stream 62 may include amine amounts (ppm-level) substantially less than the $CO_2$-rich solvent stream 50. Furthermore, the reboiler 24 and/or the regenerator 22 may also produce regenerated solvent stream 48b. In general, the regenerated solvent stream 48b (e.g., $CO_2$-lean solvent stream) includes $CO_2$/water amounts substantially less than the $CO_2$/water vapor stream 62. The regenerated solvent stream 48b may be received by pump 30 and recycled back to the absorber 14, such that it may be utilized as the solvent stream 48 accordingly. As such, it should be noted that the regenerated solvent stream 48b and solvent stream 48 may have a similar (e.g., substantially the same) composition (e.g., $CO_2$-lean solvent and/or substantially $CO_2$-free solvent).

The $CO_2$/water vapor stream 62 may be directed to a heat exchanger 26 (e.g., cooler) and generate a cooled $CO_2$/water vapor stream 62a. Accordingly, the cooled $CO_2$/water vapor stream 62a may be directed to a reflux drum 28. The reflux drum 28 may receive the cooled $CO_2$/water vapor stream 62a and separate $CO_2$ gas from condensed water and residual amine contaminants. Accordingly, the reflux drum 28 may generate $CO_2$ gas product 64. The $CO_2$ gas product 64 may be subsequently directed to a compressor and a dryer unit for compression and a storage unit (e.g., tank, reservoir, pipeline, etc.) for storage and/or transportation. The reflux drum 28 may also generate a condensed water/amine stream 66 based on the cooled $CO_2$/water vapor stream 62, which may be redirected back to the regenerator. The condensed water/amine stream 66 cools down the $CO_2$ vapor stream liberated by the regenerator 24, and therefore, reduces the utility load of the reflux condenser 26.

In the illustrated embodiment, the controller 18 may be configured to control all aspects of the carbon capture system 10. In some embodiments, the controller may be coupled to the cooling system 16. The controller 18 includes one or more processors 70 (i.e., distributed control system (DCS) and programmable logic controller (PLC), memory controller unit (MCU) 72, instructions (i.e., control logic, programming codes, and execute commands) 74 stored on the memory 72 and executable by the processor 70, and communication circuitry 76 configured to communicate with sensors 32 and various equipment of the carbon capture system 10. For example, the controller 18 is configured to receive sensor feedback from sensors 32 coupled to the absorber 14, wash system 40, cooling system 16, and/or additional components of the carbon capture system 10 and control the same equipment based on the sensor feedback, operating modes, user input, computer models, or any combination thereof. The carbon capture system 10 described herein may also include various sensors 32 positioned along solvent flow paths, gas flow path, and coolant flow paths. For example, the sensors 32 may include temperature sensors, pressure sensors, flow rate sensors, gas composition sensors (e.g., to determine amine concentration in gas phase), liquid composition sensors (e.g., to determine amine concentration in liquid phase), or any combination thereof. The sensors can be a combination of one or more of the following: elements, transmitters, control blocks, time rate, quantity ratio, and mathematical functions.

In certain embodiments, the controller 18 is configured to control operation of the carbon capture system 10 such by controlling modes of operation (e.g., controlling cooling system 16 to provide cold water 40b at a specific flow rate and/or temperature, adjust operations of the cooling system 16, adjust flow rate of thermal fluid 46 within the cooling system 16, adjust operations of wash system 40, adjust pump rate of pumps 30, adjust temperatures of intercoolers 34.

Figure 2:
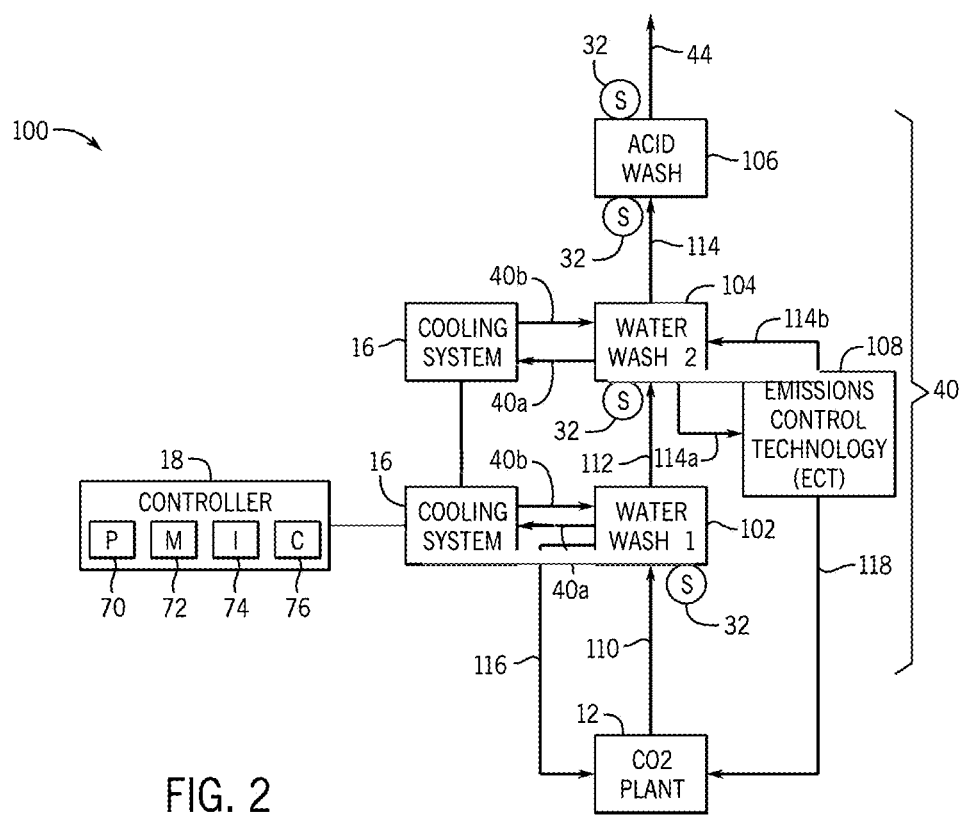
FIG. 2 is a block diagram of an embodiment of the cooling system coupled to the wash system, in accordance with the present disclosure.

By way of example, FIG. 2 is a block diagram of an embodiment of the wash system 40 and the cooling system 16 of FIG. 1. In general, FIG. 2 demonstrates an example system 100 of the carbon capture system 10. The system 100 may include the cooling system 16, the controller 18, the $CO_2$ plant 12, and the wash system 40 (e.g., water wash). It should be noted that the absorber 14 and other components from FIG. 1 have been omitted for simplicity. In general, the wash system 40 may include a first water wash 102 (e.g., water wash system or stage), a second water wash 104 (e.g., water wash system or stage), an acid wash 106 (e.g., acid wash system or stage), and emissions control technology (ECT) 108 (e.g., filter beds, membranes, sorbent materials, centrifugal separation). It should be noted that the water wash system 40 may include a plurality of components (e.g., a plurality of water washes) in various stages. In an embodiment, the cooling system 16 may be coupled to the wash system 40 to maximize the removal of residual amine from second partially treated flue gas 110 (i.e., the wash system 40 would receive second partially treated flue gas 110 via a conduit of the absorber 14 in FIG. 1).

The first water wash 102 may receive the second partially treated flue gas 110 from the absorber 14. Accordingly, the first water wash 102 may receive cold water 40*b* from the cooling system 16 to remove residual amine amounts from the second partially treated flue gas 110. Accordingly, the first water wash 102 may generate stream 112 (e.g., washed flue gas stream), wherein the stream 112 may contain amine amounts significantly less than the second partially treated flue gas 110. The first water wash 102 may also generate stream 116 (e.g., recovered amine solvent), wherein the stream 116 may include water and amine amounts substantially greater than stream 112. Accordingly, stream 116 may be routed back to the $CO_2$ plant 12 for additional processing. For example, stream 116 may include a mixture of water and condensed amine solvent from the flue gas. In general, coupling the cooling system 16 to the first water wash 102 provides downstream advantages, such as significantly reducing residual amine contamination and/or emissions in the treated flue gas 44.

The stream 112 may be directed to the second water wash 104 via a conduit, wherein the second water wash 104 may be positioned downstream from the first water wash 102. In this way, the second water wash 104 is positioned to receive stream 112 via an inlet port. Accordingly, the second water wash 102 may wash (e.g., scrub) stream 112, thereby generating stream 114 (e.g., washed flue gas stream) via an outlet port. In general, the stream 114 exhibits amine amounts substantially less than stream 112. Furthermore, second water wash 102 may generate stream 114*a* (e.g., amine-rich water stream). Stream 114*a* may contain contaminated water (including amines) that was used to scrub stream 112. Accordingly, stream 114*a* may be directed to ECT 108 to separate amines from the water and generate stream 114*b* (e.g., amine-lean water stream). Stream 114*b* may include amine amounts substantially less than stream 114*a*. Accordingly, stream 114*b* may be recycled back to the second water wash 104 to scrub residual amine amounts from stream 112. It should be noted that in some embodiments, the cooling system 16 may not be coupled to the second water wash 104 and/or the second water wash 104 may be omitted from the wash system 40. For example, in some embodiments, the cooling system 16 coupled to the first water wash 102 may remove a significant amount of amine, thereby enabling the removal of the second water wash 104.

In certain embodiments, the acid wash 106 may be employed to perform an additional, intensive cleaning step as part of the wash system 40 to further reduce amine emissions. Accordingly, the acid wash 106 may be positioned downstream from the second water wash 104 to receive stream 114 via an inlet port. The acid wash 106 may wash stream 114 thereby generating the flue gas 44 (e.g., flue gas substantially free of amine and $CO_2$), that may exit the acid wash via an outlet port. It should be noted that the cooling system 16 advantageously allows for a reduction in acid wash dosing and/or a reduction in the size of the acid wash column because a stream generated with the cooling system 16 (e.g., stream 114) would contain amine amounts substantially less than a stream generated without the cooling system 16.

Furthermore, sensors 32 may be positioned throughout the wash system 40 to obtain sensor feedback for the controller 18. Accordingly, sensor feedback may be utilized by the controller 18 to adjust parameters associated with the wash system 40 and cooling system 16. For example, the controller 18 may receive sensor feedback from one or more composition sensors (e.g., gas composition sensors, liquid composition sensors, or analytical instruments), wherein the sensor feedback may include amount of amine in one or more streams. If the amount of amine exceeds a threshold value (e.g., amount of amine in stream 114 is about the same as the amount of amine in stream 112), then the controller 18 may adjust the parameters of the cooling system 16 and/or wash system 40 to promote removal amine amounts from the one or more streams. For example, the controller 18 may increase flow of thermal fluid 46 within the cooling system 16, such that the water supply 40*b* may exhibit temperatures ranging from about 5 to 10° C. or cooler when entering the wash system 40. In another example, sensors 32 may monitor amine molarity and pH of stream 114*a* and collect data. If the data associated with amine molarity and pH are below their respective threshold values, the controller 18 may adjust parameters (e.g., increasing cooling effect provided by the cooling system 16), thereby increasing the amount of amine in stream 114*a* through additional amine removal via the wash system 40. In other embodiments, the sensors 32 may provide sensor feedback associated with water quality in stream 114*a*. In this way, the controller may adjust parameters or one or more units upstream from the ECT 108 based on the water quality.

In general, the cooling system 16 described herein provides several advantages. Due to the improved chilling effect of the cold water 40*b* provided by the cooling system 16, the carbon capture system 10 described herein is capable of significantly reducing amine emissions within the flue gas 44. As such, wash system 40 may be modified to compensate for the improvement in amine removal. In some embodiments, the size of the wash system 40 may be reduced relative to a wash system 40 using water only for cooling or to a wash system 40 without the cooling system 16. For example, the size (e.g., height, diameter, cross-sectional area, and/or volume) of first water wash 102, second water wash 104, and acid wash 106 may be decreased by at least equal to or greater than 10, 20, 30, 40, or 50 percent. It should be noted that a reduction in the size of the wash system 40 may cause a reduction in the volumetric flow of cold water 40*b*. Furthermore, the cooling system 16 may be retrofitted to an existing configuration and/or system associated with the removal of amines from an untreated flue gas. In this way, the improved chilling effect provided by the cooling system 16 provides an associated benefit in conjunction with the wash system 40.

Figure 3:
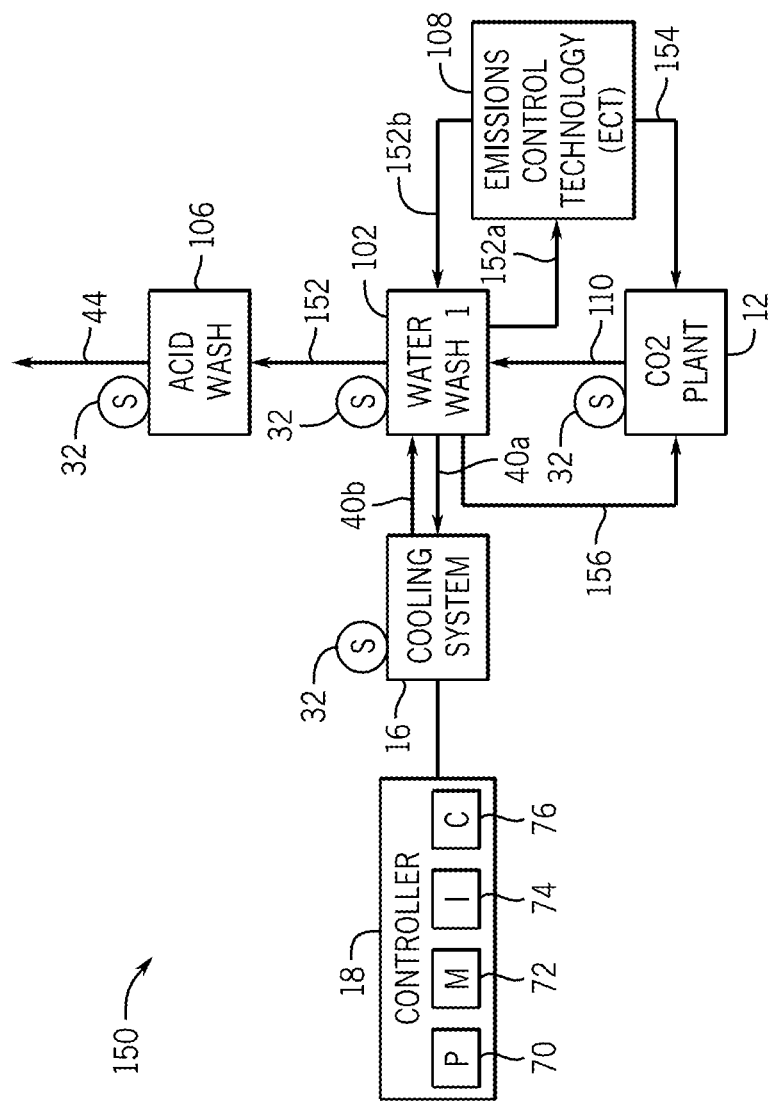
FIG. 3 is a block diagram of an embodiment of the cooling system coupled to the wash system, in accordance with the present disclosure.

With the foregoing in mind, FIG. 3 is a block diagram of an embodiment of the wash system 40 and the cooling system 16 of FIGS. 1 and 2. In general, FIG. 3 demonstrates an example system 150 of the carbon capture system 10. The system 150 may include the cooling system 16, the controller 18, the CO$_2$ plant 12, and the wash system 40. It should be noted that the absorber 14 and other components from FIG. 1 have been omitted for simplicity. The improved chilling effect of the cold water 40*b* provided by the cooling system 16 in the carbon capture system 10 described herein is capable of significantly reducing amine emissions within the flue gas 44. As such, the configuration of the wash system 40 may be modified to compensate for the improvement in amine removal due to the increased chilling effect of water supply 40*b* that is provided by the cooling system 16. Accordingly, the system 150 may be modified to include only the first water wash 102 and the acid wash 106, but without the second water wash 104. The cooling system 16 may be coupled to the first water wash 102. In some embodiments, the ECT 108 may be coupled to the first water wash 102, wherein the ECT 108 may be positioned to receive stream 152*a* (e.g., amine-rich water stream). Stream 152*a* may contain contaminated water including amines that was used to scrub second partially treated gas 110. Accordingly, in a generally similar manner as FIG. 2, the ECT 108 may separate amines from the water and generate stream 152*b* (e.g., amine-lean water stream). Stream 152*b* may include amine amounts substantially less than stream 152*a*. Accordingly, stream 152*b* may be recycled back to the first water wash 102 to scrub residual amine amounts from second partially treated gas 110. The ECT 108 may also generate stream 154 (e.g., amine stream), wherein stream 154 may be directed to the CO$_2$ plant 12 for additional processing. For example, stream 154 may include a mixture of water and condensed amine solvent from the flue gas. The first water wash 102 may generate stream 152 (e.g., washed flue gas stream) and stream 156, wherein stream 152 contains amine amounts substantially less than second partially treated gas 110. As such, stream 152 may be received by the acid wash 106 for additional processing while stream 156 may be directed to the CO$_2$ plant 12. Accordingly, the CO$_2$ plant 12 may receive stream 154 and stream 156, wherein each stream (e.g., stream 154 and stream 156) may vary by amine amount. It should be noted that in some embodiments, the cooling system 16 may be only coupled to the first water wash 102. In this way, the improved chilling effect provided by the cooling system 16 provides a reduction in energy consumption by enabling a modified configuration (e.g., system 150).

Figure 4:
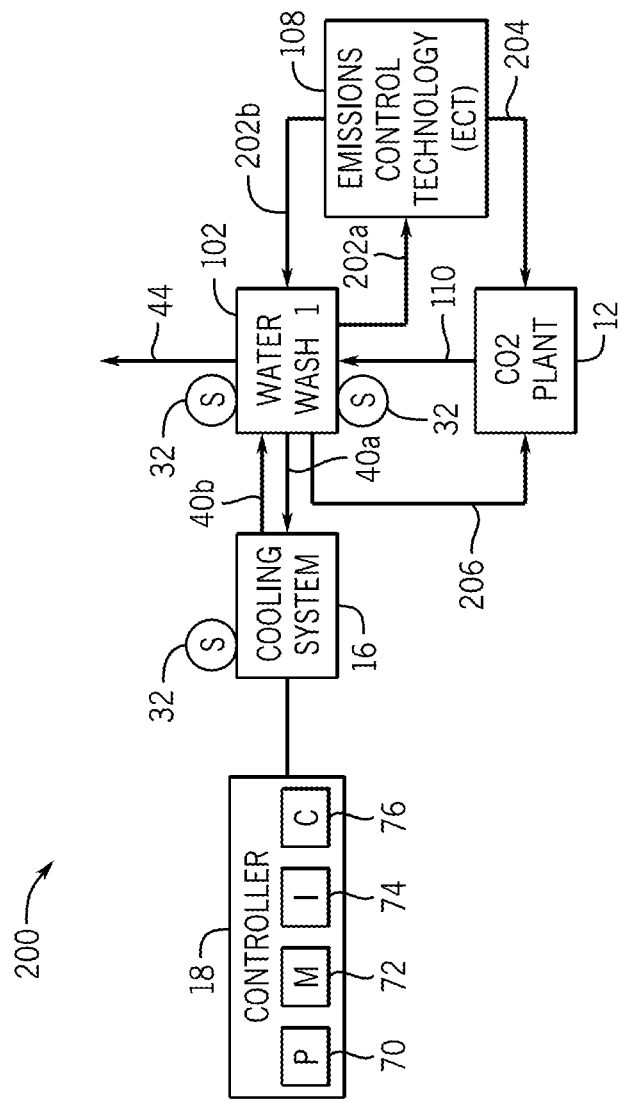
FIG. 4 is a block diagram of an embodiment of the cooling system coupled to the wash system, in accordance with the present disclosure.

By way of example, FIG. 4 is a block diagram of an embodiment of the wash system 40 and the cooling system 16 of FIGS. 1 and 2. In general, FIG. 4 demonstrates an example system 150 of the carbon capture system 10. The system 200 may include the cooling system 16, the controller 18, the CO$_2$ plant 12, and the wash system 40. It should be noted that the absorber 14 and other components from FIG. 1 have been omitted for simplicity. In general, the improved chilling effect of the cold water 40*b* provided by the cooling system 16 in the carbon capture system 10 described herein is capable of significantly reducing amine emissions within the flue gas 44. As such, the configuration of the wash system 40 may be modified to compensate for the improvement in amine removal due to the increased chilling effect of water supply 40*b* that is provided by the cooling system 16. Accordingly, the system 150 may be modified to include only the first water wash 102 without the second water wash 104 and without the acid wash 106, wherein the cooling system 16 is coupled to the first water wash 102. However, in some embodiments, the acid wash 106 may be included in the wash system of FIG. 4, wherein the acid wash 106 may be sized the same or smaller than in the embodiments of FIGS. 2 and 3. For example, the amount of acid provided by the acid wash 106 may be reduced. In some embodiments, the ECT 108 may be coupled to the first water wash 102, wherein the ECT 108 may be positioned to receive stream 202*a* (e.g., amine-rich water stream). Stream 202*a* may contain contaminated water including amines that was used to scrub second partially treated gas 110. Accordingly, in a generally similar manner as FIGS. 2 and 3, the ECT 108 may separate amines from the water and generate stream 202*b* (e.g., amine-lean water stream). Stream 202*b* may include amine amounts substantially less than stream 202*a*. Accordingly, stream 202*b* may be recycled back to the first water wash 102 to scrub residual amine amounts from second partially treated gas 110. The ECT 108 may also generate stream 204 (e.g., amine-rich stream), wherein stream 204 may be directed to the CO$_2$ plant 12 for additional processing. For example, stream 204 may include a mixture of water and condensed amine solvent from the flue gas. The first water wash 102 may generate the flue gas 44, wherein flue gas 44 (e.g., flue gas substantially free of amines and CO$_2$) contains amine amounts substantially less than second partially treated gas 110. Furthermore, the first water wash 102 may generate stream 206 (e.g., amine-rich stream), which may be directed to the CO$_2$ plant 12 for additional processing. For example, stream 206 may include a mixture of water and condensed amine solvent from the flue gas. In this way, the improved chilling effect provided by the cooling system 16 provides a reduction in energy consumption by enabling a modified configuration (e.g., system 200).

Figure 5:
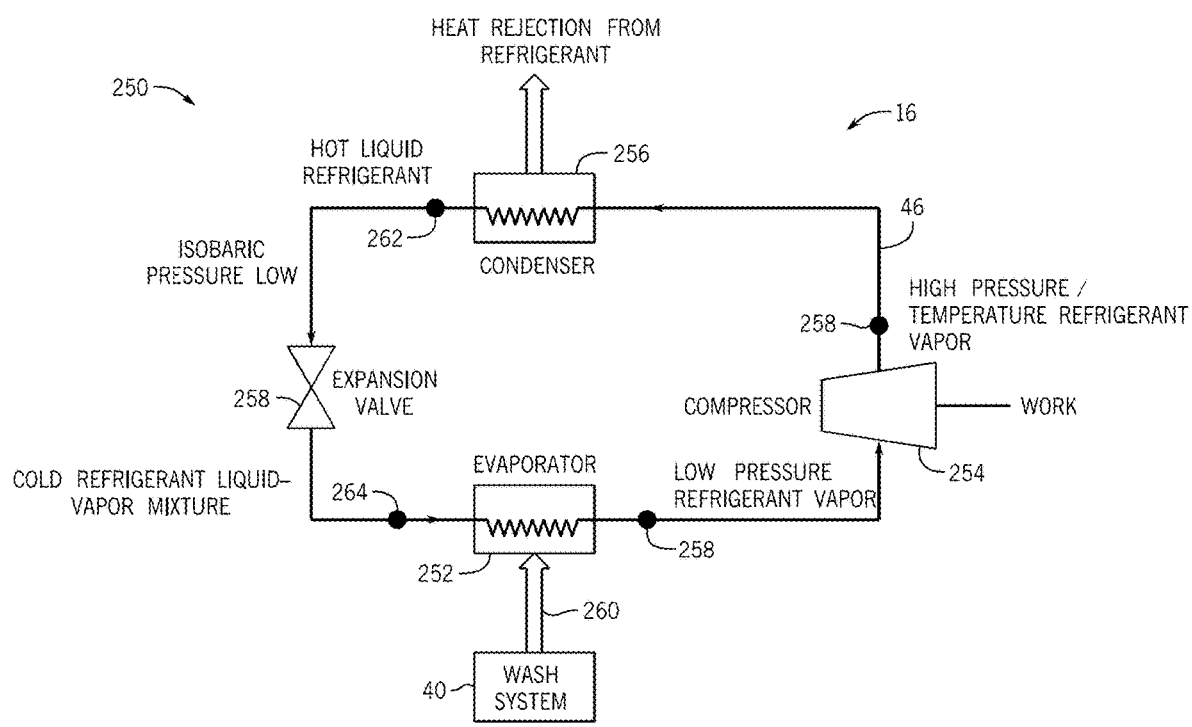
FIG. 5 is a schematic view of an embodiment of the cooling system of FIGS. 1-4, in accordance with the present disclosure.

With the preceding in mind, FIG. 5 is a schematic view of an embodiment of the of the cooling system 16 of FIGS. 1-4. In particular, FIG. 5 demonstrates an example system 250 that may employ the thermal fluid 46 (e.g., one or more mixed refrigerants) as part of the cooling system 16, which cools the water in the first water wash 102 and second water wash 104 by transferring heat from the water circulating loops (e.g., water supply 40*a*, cold water 40*b*) coupled to the cooling system 16. Accordingly, the cooling system 16 may include an evaporator 252, a compressor 254, a condenser 256, and an expansion valve 258 in a refrigeration cycle. The refrigeration cycle begins at stage 258, wherein the thermal fluid 46 may exist as a low-pressure refrigerant vapor. Accordingly, the thermal fluid 46 may undergo an isentropic compression from by the compressor 254 and transition to a high pressure/high temperature refrigerant vapor at stage 258. The high pressure/high temperature refrigerant vapor may be directed to the condenser 256, wherein the vapor may release heat (e.g., reject heat) to the surroundings as it flows at a constant pressure path, cools, and condenses, after which the thermal fluid 46 may exist in a cooler high pressure/hot liquid state at step 262. The thermal fluid 46 in its cooler high pressure/hot liquid state may be directed to the expansion valve 258, which reduces the pressure, thereby causing the thermal fluid 46 to transition to exhibit a cold temperature and transition to a cold refrigerant liquid-vapor mixture (e.g., two-phase liquid-vapor cold mixture). Accordingly, at step 264, the cold refrigerant liquid-vapor mixture may be directed to the evaporator 252, wherein the cold refrigerant liquid-vapor mixture may transition to a vapor in the presence of heat. In the illustrated embodiment, the wash fluid (e.g., water wash fluid) in the wash system 40 is cooled down by transferring heat to the thermal fluid 46 via heat exchange in the evaporator 252, as indicated by arrow 260. Thus, the thermal fluid 46 indirectly transfers heat away from the wash fluid in the wash system 40 via the evaporator 252. When heat is transferred from the wash system 40 to the cold thermal fluid 46 in the evaporator 252, the thermal fluid 46 boils and exits the evaporator 252 in the vapor phase. The process begins again when the thermal fluid 46 recycles back to the compressor 254 as a low-pressure refrigerant vapor. It should be noted that the system 250 described herein is meant to be exemplary. In certain embodiments, the cooling system 16 may include other cycles or configurations of cooling equipment.

Figure 6:
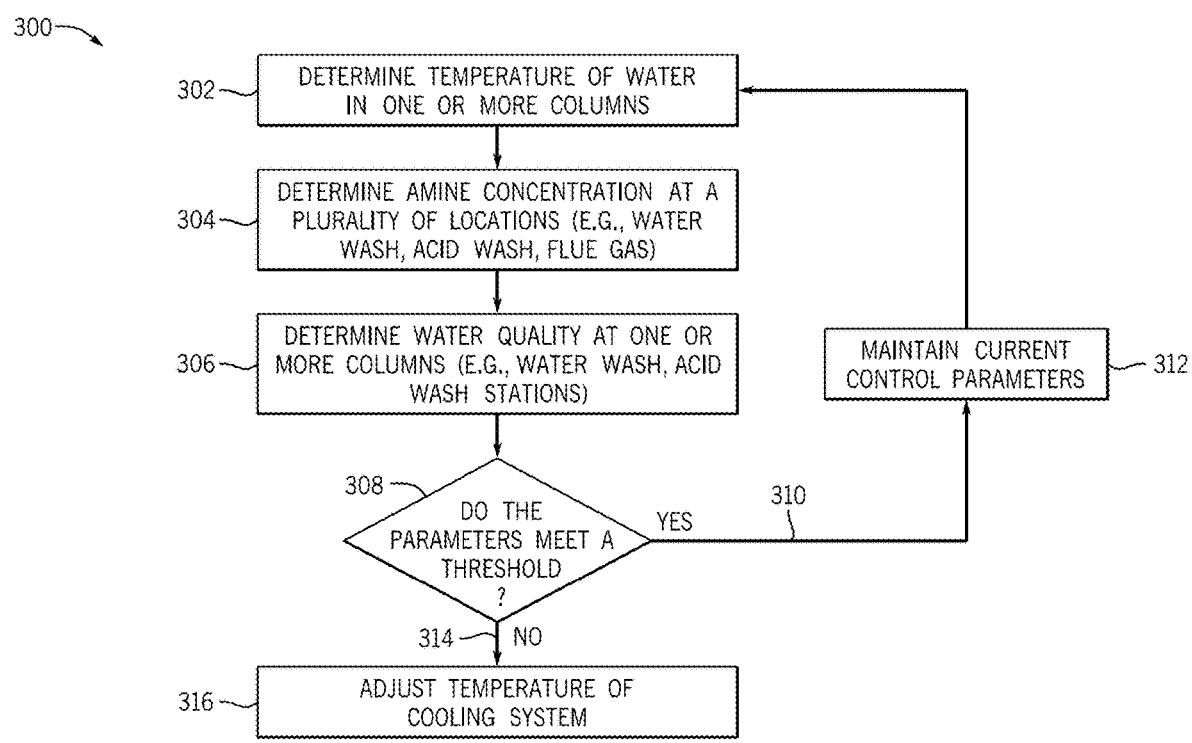
FIG. 6 is a flowchart of an embodiment of a process for operation of the carbon capture system including the cooling system coupled to the wash system of FIGS. 1-5, in accordance with present disclosure.

FIG. 6 is a flowchart of an embodiment of a process 300 for operation of the carbon capture system 10 including the cooling system 16 of FIG. 1. In certain embodiments, the process 300 is a dynamic control process that employs feed forward and feedback controllers. For example, some of the controllers in process 300 may enable the dynamic control process. The process 300 may be performed by the carbon capture system 10, the controller 18, a computing device, or any other suitable computing device(s) or controller(s). Furthermore, the blocks of the process 300 may be performed in the order disclosed herein or in any suitable order. For example, certain blocks of the process 300 may be performed concurrently or consecutively. In addition, in certain embodiments, at least one of the blocks of the process 300 may be omitted. Further, it should be noted, that the carbon capture system 10 and/or controller 18 may iteratively perform the blocks outlined in process 300.

At block 302, the carbon capture system 10 may determine temperature of cold-water supply 40*b* at one or more wash systems 40, such as wash columns, associated with absorbers 14. For example, temperature sensors may be positioned within the wash system 40 (e.g., first water wash 102, second water wash 104, acid wash 106) to determine one or more temperatures of the water providing by the cooling system 16 to the wash system 40. Sensor feedback may be generated by temperature sensors, which may be used to determine to temperature of the water supply accordingly. In an embodiment, the carbon capture system 10 the temperature of the one or more columns may be expected to range between 0° C. to 20° C., such as about 4° C. to 20° C., about 4° C. to 16° C., about 8° C. to 12° C., or about 5° C. to 10° C.

At block 304, the carbon capture system 10 may determine amine concentration at a plurality of locations. For example, gas composition sensors and/or liquid composition sensors and/or analytical measurements may determine amine concentration from various streams generated by the wash system 40 (e.g., first water wash 102, second water wash 104, acid wash 106, ECT 108), flue gas 44, second partially treated flue gas 110, or any other component within the carbon capture system 10. The carbon capture system 10 may determine that amine concentration is decreasing in the flue gas 44 as the flue gas 44 undergoes treatment and progresses through the wash system 40. Accordingly, amine concentration may be determined in samples and/or streams that may be in a vapor phase or liquid phase.

At block 306, the carbon capture system 10 may determine water quality at one or more wash columns. For example, sensors and/or analytical measurements may determine water quality from various streams generated by the wash system 40 (e.g., first water wash 102, second water wash 104, acid wash 106, ECT 108) or any other component within the carbon capture system 10. Accordingly, water quality may be determined in the liquid phase.

At block 308, the carbon capture system 10 may determine whether the parameters (e.g., temperature, amine amount, water quality) meet a threshold (e.g., threshold range between upper and lower thresholds). For example, the threshold may be based on previous sensor feedback acquired by sensors 32. In some embodiments, the threshold may be determined by determining an amine emission amount from the flue gas 44.

At block 310, if the carbon capture system 10 determines that the parameters meet the threshold value (e.g., amine emission is less than 10 ppm in flue gas 44), the carbon capture system 10 may maintain the current control parameters, as described in block 312. In some embodiments, the carbon capture system 10 may modify operations of the wash system 40 by utilizing only portions of the wash system 40 (e.g., first water wash 102) to reduce energy consumption if the amine amount at the flue gas 44 is less than or equal to the threshold value. Accordingly, the process 300 may restart and begin at block 302.

At block 314, if the carbon capture system 10 determines that the parameters do not meet the threshold value (e.g., amine emission is greater than 10 ppm in flue gas 44, temperature of the water in the first water wash is greater than 20° C.), the carbon capture system 10 may adjust parameters of the cooling system 16. For example, the carbon capture system 10 may adjust the flow cycle of the thermal fluid 46 (e.g., refrigerant, water-glycol mixture, etc.) to increase the chilling effect of the cold-water supply 40*b* that is directed to the wash system 40. In this way, colder water may be provided to the wash system 40 to increase amine scrubbing in the washing process (e.g., processes associated with wash system 40) and subsequently reduce amine slip in the flue gas 44. It should be noted that process 300 may be repeated until the parameters meet the threshold value. Furthermore, it should be noted that analytical measurements (e.g., sensor feedback generated by sensors 32) may be acquired batch-type or continuous-type.

A technical effect of the disclosed embodiments includes a cooling system to increase the chilling effect of cold water within the wash system (e.g., water wash columns) as part of a carbon capture system. The cooling system may employ a thermal fluid 46 (e.g., refrigerant, water-glycol mixture, etc.) that can help chill a water supply between 0° C. to 20° C., such as about 4° C. to 20° C., about 4° C. to 16° C., about 8° C. to 12° C., or about 5° C. to 10° C. Thus, the cooling system supports the wash system by providing a cold-water supply, wherein the cold water may increase the removal of amine contamination in a flue gas, thereby decreasing amine emissions in treated flue gas. Furthermore, due to the increasing chilling effect provided by the cooling system to the cold-water supply, the improvements in amine removal enable modification of the wash system. Accordingly, the wash system may be modified to include only a first water wash and an acid wash, wherein the cooling system is coupled to the first water wash. Alternatively, the wash system may be modified to include only the first water wash, wherein the cooling system may be coupled to first water wash. Thus, the modified configurations of the wash system reduce overall energy consumption.

The subject matter described in detail above may be defined by one or more clauses, as set forth below.

A system includes a solvent-based carbon capture system, wherein the solvent-based carbon capture system includes an absorber configured to capture carbon oxides from a gas flow via a solvent flow to produce a treated gas flow. The system also includes a water wash system configured to wash the treated gas flow using water. The system further includes a cooling system configured to cool the water of the water wash system, wherein the cooling system is configured to circulate a thermal fluid to reduce a temperature of the water in the water wash system.

The system of the preceding clause, wherein the water wash system has only one water wash.

The system of any preceding clause, wherein the water wash system includes a plurality of water washes in a plurality of stages.

The system of any preceding clause, wherein the solvent-based carbon capture system further includes an acid wash system.

The system of any preceding clause, wherein the water wash system is configured to remove at least a portion of solvent in the treated gas flow into the water to produce a solvent-rich water and a washed gas flow.

The system of any preceding clause, wherein the water wash system is coupled to an emissions control technology (ECT), wherein the ECT is configured to remove amine from the solvent-rich water to produce a water stream and a solvent stream, and the ECT is configured to return the water stream to the water wash and return the solvent stream to the absorber.

The system of any preceding clause, wherein the carbon oxides include carbon dioxides in the gas flow.

The system of any preceding clause, wherein the thermal fluid includes a water glycol mixture.

The system of any preceding clause, wherein the thermal fluid includes a refrigerant and the cooling system includes a refrigerant cycle.

The system of any preceding clause, wherein the cooling system is configured to cool the water to a temperature of less than or equal to 15 degrees Celsius.

The system of any preceding clause, further comprising a controller coupled to the cooling system and configured to control the cooling system to adjust a temperature of the water, increase amine loading in the water from the water wash system, reduce amine slip from the treated gas exiting the water wash system, or a combination thereof.

A method includes capturing carbon oxides from a gas flow via a solvent flow in an absorber of a solvent-based carbon capture system to produce a treated gas flow. The method also includes washing the treated gas flow using water in a water wash system. The method further includes cooling the water of the water wash system via a cooling system, wherein cooling the water includes circulating a thermal fluid to reduce a temperature of the water in the water wash system.

The method of the preceding clause, wherein circulating the thermal fluid includes circulating a water glycol mixture through a heat exchanger to indirectly transfer heat away from the water into the water glycol mixture.

The method of any preceding clause, wherein circulating the thermal fluid includes circulating a refrigerant through a refrigeration cycle to indirectly transfer heat away from the water into the refrigerant.

The method of any preceding clause, wherein capturing carbon oxides includes capturing carbon dioxide from the gas flow.

The method of any preceding clause, wherein comprising controlling the cooling system via a controller to adjust a temperature of the water in the water wash system.

The method of any preceding clause, wherein controlling to adjust the temperature includes maintaining the temperature of the water below a threshold temperature to reduce a concentration of solvent in the treated gas flow below a threshold concentration of the solvent.

A system includes a controller having a processor, a memory, and instructions stored on the memory and executable by the processor to control a solvent-based carbon capture system to capture carbon oxides from a gas flow via a solvent flow in an absorber to produce a treated gas flow. The instructions include controlling a water wash system to wash the treated gas flow using water. The instructions also include controlling a cooling system to cool the water of the water wash system, wherein the cooling system is configured to circulate a thermal fluid to reduce a temperature of the water in the water wash system.

The system of the preceding clause, wherein the controller is configured to control the cooling system to adjust a temperature of the water in the water wash system.

The system of any preceding clause, wherein the controller is configured to maintain the temperature of the water below a threshold temperature to reduce a concentration of solvent in the treated gas flow below a threshold concentration of the solvent.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a solvent-based carbon capture system, wherein the solvent-based carbon capture system comprises:
   an absorber configured to capture carbon oxides from a gas flow via a solvent flow to produce a treated gas flow;
   a water wash system comprising first and second water washes configured to wash the treated gas flow using water, wherein the second water wash is downstream from the first water wash along a flow path of the treated gas flow;
   a first sensor disposed along the flow path between the first and second water washes, wherein the first sensor is configured to generate first sensor feedback indicative of a first concentration of solvent in the treated gas flow;
   a plurality of cooling systems comprising a first cooling system and a second cooling system, wherein each of the first cooling system and the second cooling system comprises a heat exchanger configured to cool the water of the water wash system via indirect heat transfer from the water to a thermal fluid, wherein the first cooling system is coupled to the first water wash and the second cooling system is coupled to the second water wash, and wherein the thermal fluid comprises a water-glycol mixture; and
a controller communicatively coupled to the water wash system, the first sensor, and the plurality of cooling systems, wherein the controller is configured to:
compare the first concentration of solvent to a first threshold value;
control the plurality of cooling systems to increase cooling of the water to a temperature ranging from about 5° C. to 10° C. in the water wash system and control the water wash system to increase washing of the treated gas flow to increase solvent removal from the treated gas flow when the first concentration of solvent is greater than the first threshold value; and
control the water wash system to reduce washing of the treated gas flow at least by operating only the first water wash coupled to the first cooling system without the second water wash coupled to the second cooling system when the first concentration of solvent is less than or equal to the first threshold value.

2. The system of claim 1, wherein the solvent-based carbon capture system further comprises an acid wash system.

3. The system of claim 1, wherein the water wash system is configured to remove at least a portion of the solvent in the treated gas flow into the water to produce a solvent-rich water and a washed gas flow.

4. The system of claim 3, wherein the water wash system is coupled to an emissions control technology (ECT), wherein the ECT is configured to remove the solvent from the solvent-rich water to produce a water stream and a solvent stream, and the ECT is configured to return the water stream to the water wash system and return the solvent stream to the absorber.

5. The system of claim 1, wherein the carbon oxides comprise carbon dioxide in the gas flow.

6. The system of claim 1, wherein the thermal fluid comprises a refrigerant and each of the plurality of cooling systems comprises a refrigerant cycle.

7. The system of claim 1, wherein the controller is configured to control the plurality of cooling systems to reduce a temperature of the water by increasing a flow rate of the thermal fluid or decreasing a temperature of the thermal fluid, increase a solvent loading in the water from the water wash system, and reduce a solvent slip from the treated gas flow exiting the water wash system.

8. A method, comprising:
capturing carbon oxides from a gas flow via a solvent flow in an absorber of a solvent-based carbon capture system to produce a treated gas flow;
washing the treated gas flow using water in first and second water washes of a water wash system, wherein the second water wash is downstream from the first water wash along a flow path of the treated gas flow;
receiving first sensor feedback indicative of a first concentration of solvent in the treated gas flow via a first sensor disposed along the flow path between the first and second water washes;
cooling the water of the water wash system via indirect heat transfer from the water to a thermal fluid in each heat exchanger of a plurality of cooling systems comprising a first cooling system and a second cooling system, wherein the first cooling system is coupled to the first water wash and the second cooling system is coupled to the second water wash, and wherein the thermal fluid comprises a water-glycol mixture;
comparing, via a controller, the first concentration of solvent to a first threshold value;
controlling, via the controller, the plurality of cooling systems to increase cooling of the water to a temperature ranging from about 5° C. to 10° C. in the water wash system and controlling the water wash system to increase washing of the treated gas flow to increase solvent removal from the treated gas flow when the first concentration of solvent is greater than the first threshold value; and
controlling, via the controller, the water wash system to reduce washing of the treated gas flow at least by operating only the first water wash coupled to the first cooling system without the second water wash coupled to the second cooling system when the first concentration of solvent is less than or equal to the first threshold value.

9. The method of claim 8, wherein the thermal fluid comprises a refrigerant, and each of the plurality of cooling systems comprises a refrigeration cycle.

10. The method of claim 8, wherein capturing the carbon oxides comprises capturing carbon dioxide from the gas flow.

11. The method of claim 8, wherein controlling the plurality of cooling systems comprises reducing a temperature of the water in the water wash system at least by increasing a cooling effect of the thermal fluid when the first concentration of solvent is greater than the first threshold value.

12. The method of claim 11, wherein increasing the cooling effect of the thermal fluid comprises increasing a flow rate of the thermal fluid or decreasing a temperature of the thermal fluid when the first concentration of solvent is greater than the first threshold value.

13. A system, comprising:
a controller having a processor, a memory, and instructions stored on the memory and executable by the processor to control a solvent-based carbon capture system to:
capture carbon oxides from a gas flow via a solvent flow in an absorber to produce a treated gas flow;
control a water wash system to wash the treated gas flow using water in first and second water washes of the water wash system, wherein the second water wash is downstream from the first water wash along a flow path of the treated gas flow;
receive first sensor feedback indicative of a first concentration of solvent in the treated gas flow via a first sensor disposed along the flow path between the first and second water washes;
control a plurality of cooling systems to cool the water of the water wash system via indirect heat transfer from the water to a thermal fluid in each heat exchanger of the plurality of cooling systems comprising a first cooling system and a second cooling system, wherein the first cooling system is coupled to the first water wash and the second cooling system is coupled to the second water wash, and wherein the thermal fluid comprises a water-glycol mixture;
compare the first concentration of solvent to a first threshold value;
control the plurality of cooling systems to increase cooling of the water to a temperature ranging from about 5° C. to 10° C. in the water wash system and and/e control the water wash system to increase washing of the treated gas flow to increase solvent removal from the treated gas flow when the first concentration of solvent is greater than the first threshold value; and control the water wash system to reduce washing of the treated gas flow at least by operating only the first water wash coupled to the first cooling system without the second water wash coupled to the second cooling system when the first concentration of solvent is less than or equal to the first threshold value.

14. The system of claim 13, wherein the controller is configured to control the plurality of cooling systems to reduce a temperature of the water by increasing a flow rate of the thermal fluid or decreasing a temperature of the thermal fluid when the first concentration of solvent is greater than the first threshold value.

* * * * *